US 10,544,026 B2

(12) United States Patent
Rasmussen et al.

(10) Patent No.: US 10,544,026 B2
(45) Date of Patent: Jan. 28, 2020

(54) METHOD AND A SYSTEM FOR INTRODUCING NITROGEN INTO A BEVERAGE

(71) Applicant: Carlsberg Breweries A/S, Copenhagen V (DK)

(72) Inventors: Jan Norager Rasmussen, Olstykke (DK); Steen Vesborg, Gentofte (DK)

(73) Assignee: Carlsberg Breweries A/S, Copenhagen (DK)

( * ) Notice: Subject to any disclaimer, the term of this patent is extended or adjusted under 35 U.S.C. 154(b) by 221 days.

(21) Appl. No.: 15/558,703

(22) PCT Filed: Mar. 17, 2016

(86) PCT No.: PCT/EP2016/055814
§ 371 (c)(1),
(2) Date: Sep. 15, 2017

(87) PCT Pub. No.: WO2016/146749
PCT Pub. Date: Sep. 22, 2016

(65) Prior Publication Data
US 2018/0111811 A1    Apr. 26, 2018

(30) Foreign Application Priority Data

Mar. 18, 2015  (EP) .................................... 15159607

(51) Int. Cl.
*B67C 3/30*    (2006.01)
*C12C 11/11*   (2019.01)
(Continued)

(52) U.S. Cl.
CPC .............. *B67C 3/30* (2013.01); *B65B 31/046* (2013.01); *B67B 3/22* (2013.01); *C12C 11/11* (2013.01)

(58) Field of Classification Search
CPC ........... B67C 3/30; B65B 31/046; B67B 3/22; C12C 11/11
See application file for complete search history.

(56) References Cited

U.S. PATENT DOCUMENTS 4,538,652 A * 9/1985 Valentin ................... C12G 1/06
141/37
4,573,505 A    3/1986 Lee et al.
(Continued)

FOREIGN PATENT DOCUMENTS

DE    102008033818    1/2010
EP       1798190       6/2007
(Continued)

OTHER PUBLICATIONS

International Search Report on corresponding PCT application (PCT/EP2016/055814) from International Searching Authority (EPO) dated Jun. 7, 2016.
(Continued)

*Primary Examiner* — Anthony J Weier
(74) *Attorney, Agent, or Firm* — Klein, O'Neill & Singh, LLP

(57) ABSTRACT

The present invention relates to a method of introducing nitrogen into a beverage container. The beverage container (10) includes a cylindrical neck part (16) having a circumferential rim (18) defining an opening (20). The cylindrical neck part includes an outer circumferential flange (22) encircling the cylindrical neck part. A connecting element (36) having a circular closure plate (64) and a cylindrical housing (54) having a set of inwardly oriented locking parts (56) is positioned such that the cylindrical housing is at least partially covering the cylindrical neck part and a fluid path (58) is defined between the connecting element and the cylindrical neck part. A collar (42, 44) having a gas inlet (48) is placed about the cylindrical neck part and gas is injected (Continued)

into the beverage container via the gas inlet. Finally, the connecting element is moved towards the cylindrical neck part for arresting the connecting element to the cylindrical neck part and sealing the circular closure plate against the circumferential rim.

22 Claims, 9 Drawing Sheets

(51) Int. Cl.
*B67B 3/22* (2006.01)
*B65B 31/04* (2006.01)

(56) References Cited

U.S. PATENT DOCUMENTS

| | | | |
|---|---|---|---|
| 4,827,965 A | 5/1989 | Wates | |
| 2012/0103198 A1* | 5/2012 | Koslow | A23L 2/54 99/323.1 |
| 2013/0089645 A1* | 4/2013 | Leung | A23L 2/54 426/397 |
| 2014/0339269 A1 | 11/2014 | Fezer | |

FOREIGN PATENT DOCUMENTS

| | | | |
|---|---|---|---|
| EP | 2258629 | | 12/2010 |
| FR | 427947 | | 8/1911 |
| GB | 2483235 | | 3/2012 |
| JP | 61-173771 | | 8/1986 |
| JP | S6423991 | | 1/1989 |
| WO | WO2009/142510 | | 11/2009 |
| WO | WO2011/062891 | | 5/2011 |
| WO | WO2015021498 | * | 2/2015 |

OTHER PUBLICATIONS

Written Opinion on corresponding PCT application (PCT/ EP2016/ 055814) from International Searching Authority (EPO) dated Jun. 7, 2016.

* cited by examiner

METHOD AND A SYSTEM FOR INTRODUCING NITROGEN INTO A BEVERAGE

CROSS-REFERENCE TO RELATED APPLICATIONS

This application is the national phase entry, under 35 U.S.C. Section 371(c), of International Application No. PCT/EP2016/055814, filed Mar. 17, 2016, claiming priority from European Application No. 15159607.9, filed Mar. 18, 2015. The disclosures of the International Application and the European Application from which this application claims priority are incorporated herein by reference in their entireties.

FEDERALLY SPONSORED RESEARCH OR DEVELOPMENT

Not Applicable

The present invention relates to a method and a system for introducing nitrogen into a beverage.

INTRODUCTION

Draught beverages, e.g. carbonated beverages, such as draught beer, are conventionally delivered to the place of consumption in rigid steel containers known as kegs and holding a large amount of beverage, such as e.g. 25 liters or more. Such steel kegs are heavy and intended to be re-used, resulting in significant transportation and cleaning costs. The dispensing of the beverage from such steel kegs as described above requires elaborate dispensing assemblies which are capable of both pressurizing and cooling the beverage. The pressurization is typically made using a carbon dioxide cartridge connected to the keg during dispensing. The carbon dioxide cartridge provides the dispensing pressure and allows the beverage to remain carbonized and oxygen-free within the keg until the beverage is being dispensed.

Nowadays there exist simpler and lighter kegs made of collapsible plastics materials, such as PET. Collapsible keg should in the present context be understood to be a container of primarily a polymeric material which is capable of being crumpled or compacted without rupturing as the beverage is being dispensed. Such collapsible kegs, which in the following will be referred to as collapsible containers, are intended for single use and thus do not have to be transported back to the brewery for cleaning and re-filling. The beverage stored within such collapsible containers may be dispensed using simpler dispensing assemblies which do not require a source of carbon dioxide connected to the beverage container. Instead, the beverage container is stored in a pressure chamber of the beverage dispensing assembly which uses any source of pressure for applying a pressure outside the beverage container for collapsing the beverage container and providing the required dispensing pressure. This source of pressure may thus advantageously be air. Thus, the beverage stored in a collapsible container is usual pre-carbonized, i.e. already includes the appropriate amount of carbon dioxide when filled at the brewery. One notable example of a collapsible container as described above may be found in the present applicant's own European patent EP 1 798 190 B1.

Some types of beers include an amount of nitrogen in addition to or replacing some of the carbon dioxide. This is particular common for English type beers, such as ales, stouts, bitters, porters and similar types or beer. Nitrogen is however much less soluble in the beverage compared to carbon dioxide. Thus, nitrogen may be applied at a much higher pressure than carbon dioxide, which is typically applied at pressures of 1-2 barg (gauge pressure in bar). Applying carbon dioxide at a higher pressure, e.g. above about 3 barg, results in overcarbonization of the beverage which would cause an uncontrolled foaming of the beverage during dispensing of the beverage since the dissolved carbon dioxide will, when subjected to atmospheric pressure, separate from the beverage and cause an intense production of carbon dioxide bubbles. On the contrary, applying nitrogen to the beverage at a higher pressure than the carbon dioxide, e.g. above 3 barg, such as 4 to 5 barg, and even higher, such as 5 to 10 barg, or even 10-15 barg, will not result in the beverage being overcarbonated or an intense foaming during the dispensing of the beverage. Instead, when the beverage is dispensed, the increased pressure from the nitrogen will allow the beverage to form a firmer, thicker and creamier head which is commonly known as a "nitrogen head". The taste of the beverage will be sweeter and less acidic.

When dispensing nitrogen containing beers using a conventional steel keg, the nitrogen may be supplied together with the carbon dioxide directly into the beverage similar to a conventional carbon dioxide beverage dispensing assembly. Preferably, a mixture of carbon dioxide and nitrogen is used, such as 75% nitrogen, 25% carbon dioxide mixture. The pressure, which acts as dispensing pressure, may be higher than in a pure carbon dioxide beverage dispensing assembly, i.e. above 2-3 barg.

However, when using a collapsible container as described above, the dispensing pressure is applied outside the container and no gas is intended to be mixed with the beverage during dispensing. Thus, the nitrogen, just as the carbon dioxide, has to be pre-mixed into the beverage before shipping the container to the place of consumption.

The introduction of nitrogen in beverages has been investigated for many years. FR 427947 suggests treating various alcoholic beverage by nitrogen.

In GB 2483235 it is suggested to extracting a portion of the beer from the holding tank, raising the pressure of this beer portion to a pressure in the range 12-15 bar, adding excess nitrogen to the pressurized beer portion, and returning the pressurized beer portion with excess nitrogen to the holding tank.

JP 61-173771 suggests filling the beer in a container, such as a can, dropping liquid nitrogen (LN2) on the beer surface, and sealing up the above-mentioned container.

US 2014/0339269 A1 relates to a packaging for filling and extraction of beer with addition of nitrogen in the beer. The nitrogen is deposited directly into the packaging in contact with the beer.

U.S. Pat. No. 4,827,965 relates to nitrogen/carbon dioxide mixing valves in which nitrogen and carbon dioxide are admitted, through separate valves actuated by single high hysteresis actuator, into a mixing device when the mixture is fed to a beer keg. The mixture composition remains substantially constant when the N2 and CO2 gases are at substantially different pressure.

None of the above documents deal with the specific problem of introducing nitrogen into a collapsible beverage container filled by a pre-carbonized beverage.

The object according to the present invention is thus to provide technologies for introducing nitrogen into a beverage container comprising a pre-carbonized beverage.

SUMMARY OF THE INVENTION

At least the above object or at least one of numerous further objects, which will be evident from the below description of the present invention, is according to a first aspect of the present invention obtained by a method of introducing nitrogen into a beverage, the method comprising the steps of:

provide a collapsible beverage container defining an inner volume, the beverage container comprising a cylindrical neck part, the cylindrical neck part having a circumferential rim defining an opening for allowing access to the inner volume, the cylindrical neck part further comprising an outer circumferential flange encircling the cylindrical neck part, filling the beverage into the inner volume via the opening, providing a connecting element comprising a cylindrical housing and a circular closure plate, the cylindrical housing comprising a set of inwardly oriented locking parts, positioning the connecting element in a first position in which the cylindrical housing is at least partially covering the cylindrical neck part, the set of inwardly oriented locking parts being located adjacent the cylindrical neck part between the outer circumferential flange and the circumferential rim and the circular closure plate being located spaced apart relative to the circumferential rim, thereby defining a fluid path between the connecting element and the cylindrical neck part, placing a collar about the cylindrical neck part, the collar sealing against the connecting element and the beverage container thereby establishing an annular space outside the cylindrical neck part, the collar comprising a gas inlet for allowing access to the annular space.

injecting gas into the inner space of the beverage container via the gas inlet, the annular space, the fluid path and the opening, and moving the connecting element towards the cylindrical neck part, thereby causing the connecting element to move from the first position to a second position in which the set of inwardly oriented locking parts moves to an arresting position wherein the outer circumferential flange being located between the opening and the set of inwardly oriented locking parts for arresting the connecting element to the cylindrical neck part, and in which the circular closure plate seals against the circumferential rim.

The collapsible beverage container as such is known from e.g. EP 1 798 190 B1 and is typically blow molded and of a polymeric material. Such collapsible beverage containers typically comprise an inner volume of between 5 and 50 liters, such as about 25 liters. The beverage container comprises a body part constituting the major part of the beverage container and a neck part which constitutes a minor part of the beverage container. The beverage container is collapsible, i.e. during dispensing the beverage container is capable of being compressed as the beverage is forced out of the beverage container. For the purpose of filling the beverage into the beverage container and dispensing the beverage from the beverage container, the beverage container comprises an opening defined a rim at the neck part of the beverage container. The neck further comprises an outer circumferential flange for cooperating with a connecting element.

The connecting element constitutes the closing part for closing off the opening of the beverage container. The connecting element also provides an interface to a tapping line of the beverage dispensing assembly for dispensing the beverage from the beverage container. The connecting element comprises a circular closure plate which is intended to cover and seal against the opening of the beverage container. The connecting element further comprises a housing connected to the circular closure plate. The housing includes locking parts which are adapted for arresting or interlocking with the circumferential flange on the neck of the beverage container such that the circular closure plate may be held and sealed against the rim on the neck of the beverage container. The locking parts may e.g. be inwardly oriented tabs of the housing which may be sloped and/or flexible.

The inner volume of the beverage container is filled by a beverage, preferably being a pre-carbonized beverage, such as beer, thereby leaving a small amount of headspace in the body and neck part of the beverage container. The head space amounts to less than 5% of the total volume of the beverage container, preferably less than 2%. After filling the beverage the connecting element is placed in a first position on the neck part of the beverage container. In the first position, which is a loose position, the locking part has not yet interlocked with the circular flange of the neck. Instead, the locking part rests on top of the circular flange, between the circular flange and the rim. Thus, the circular plate has not yet sealed against the rim and thus there exists fluid communication between the inner space of the beverage container and the outside via a fluid path between the neck and the connecting element, between the locking parts and the circumferential flange, and between the opening of the neck and the circular plate.

The collar is placed about the cylindrical neck such that it seals against the connecting element and a suitable part of the beverage container, such as the neck part of the beverage container, the body part of the beverage container or a shoulder part of the beverage container located between the neck part of the beverage container and the body part of the beverage container. The collar may preferably be of a two part construction which may be easily applied and removed. When the collar is applied, it establishes a sealed-off and pressure tight annular space outside the neck part. The annular space is in fluid communication with the inner volume of the beverage container via the fluid path. Pressurized gas is thereafter injected into the annular space, whereby the gas, preferably being nitrogen, however in principle any substantially inert and non-soluble gas may be used. The word gas should be understood to encompass any substance which is in gaseous phase at standard room temperatures and pressures. Thus, the gas may be a liquefied gas, such as liquid nitrogen, which is injected under high pressures and/or low temperatures and thereby maintains its liquid phase. The gas flows from the annular space via the fluid path into the head space of the inner space of the beverage container.

Finally, the opening is sealed off by moving the connecting element from the first position to the second position while keeping the collar sealed onto the connecting element. Thereby, the connecting element is pushed towards the beverage container such that the housing covers a greater part of the neck and the locking parts be located between the circumferential flange and the body part of the beverage container. A piston may be used for this purpose. In the second position, the locking parts have been urged past the circumferential flange into a firmly arrested and interlocked position and at the same time the circular plate is pressed and sealed against the rim thereby closing off the opening. The flexibility of the housing provides a sealing pressure capable of withstanding the elevated pressure within the beverage container. When the opening has been sealed off, the collar may be removed.

According to a further embodiment of the first aspect, the gas is nitrogen ($N_2$), a compound including nitrogen, such as $N_2O$, or a mixture including nitrogen, such as a mixture of $CO_2$ and $N_2$. As stated above, nitrogen is the preferred gas for generating the typical nitrogen head of the beers of the ale type. Alternatively, $N_2O$, i.e. laughing gas, may be used, or a mixture of carbon dioxide and nitrogen.

According to a further embodiment of the first aspect, the beverage is a carbonated beverage, preferably beer, more preferably stout or porter. Typically, the present method may be used together with ale type beers, such as stout or porter.

According to a further embodiment of the first aspect, the collar comprises a first collar half part and a second collar half part, when placing the collar about the neck part, the first collar half part and the second collar half part mutually sealing against each other forming the collar. The half parts may attach to the neck of the beverage container from opposing sides, thereby establishing the annular space.

According to a further embodiment of the first aspect, the cylindrical neck part comprises a further outer circumferential flange constituting a delimitation between the cylindrical neck part and a body part of the beverage container, the collar sealing against the body part of the beverage container adjacent the further outer circumferential flange. The further outer circumferential flange is used for holding the beverage container when blow molding, filling, capping, transporting and otherwise manipulating the beverage container for allowing the upper circumferential flange to be non-damaged for maintaining a proper arresting of the locking parts of the housing of the connecting part. A further advantage is that the locking parts may be better arrested between the circumferential flanges.

According to a further embodiment of the first aspect, the connecting element is moved towards the neck part using a piston. As stated above, preferably a piston Is used when moving the connecting element from the first position to the second position after the injecting of the gas has been completed.

According to a further embodiment of the first aspect, the beverage container is a blow molded beverage container, preferably made of plastic. As stated above, preferably the container is made of blow molded plastics, as such containers will be able to collapse and compact without rupturing when subjected to an external pressure.

According to a further embodiment of the first aspect, gas is injected at a pressure of above 2 barg, such as 3 to 4 barg, and even higher, such as 5 to 10 barg, or even 10-15 barg. The pressure of the injected gas is preferably higher that the equilibrium pressure of the beverage in order to establish the desired creamy head.

According to a further embodiment of the first aspect, the circular closure plate comprises a pierceable membrane. When the container is installed in the pressure chamber of the beverage dispensing assembly, the membrane may be pierced by a tapping line in order to initiate beverage dispensing. The membrane may e.g. be of a polymeric material, such as rubber or a metal material, such as aluminum.

According to a further embodiment of the first aspect, the gas inlet comprises a check valve and/or a pressure gauge. In order to avoid that gas flows in the reverse direction from the container into the pressure inlet, the pressure inlet may be provided with a check valve. Further, the gas inlet may be provided with a pressure gauge in order to determine the amount of gas injected into the beverage container.

According to a further embodiment of the first aspect, the connecting element comprises an outer cylindrical wall adapted to slidably seal against the collar. In order to maintain a sealed connection between the collar and the connecting part during the transition from the first position to the second position, the connecting element may be provided with an outer cylindrical wall adapted to slidably seal against the collar.

According to a further embodiment of the first aspect, the collar comprises an upper sealing element sealing against the connecting element, and a lower sealing element sealing against the beverage container. Conversely, the collar may be provided with matching sealing lips for sealing against the connecting element and against the neck part, shoulder part or body part of the beverage container.

According to a further embodiment of the first aspect, the set of inwardly oriented locking parts comprises 2-10 flexible, sloped and spaced apart protrusions. In order to establish a proper fluid part, the protrusions are preferably spaced apart in the annular direction for providing passage through channels when injecting the gas.

At least the above object or at least one of numerous further objects which will be evident from the below description of the present invention, is according to a second aspect of the present invention obtained by a system for introducing nitrogen into a beverage, the system comprising:

A collapsible beverage container defining an inner volume filled by the beverage, the beverage container comprising a cylindrical neck part, the cylindrical neck part having a circumferential rim defining an opening for allowing access to the inner volume, the cylindrical neck part further comprising an outer circumferential flange encircling the cylindrical neck part, a connecting element comprising a cylindrical housing and a circular closure plate, the cylindrical housing comprising a set of inwardly oriented locking parts, the connecting element being positionable in a first position in which the cylindrical housing is at least partially covering the cylindrical neck part, the set of inwardly oriented locking parts being located adjacent the cylindrical neck part between the outer circumferential flange and the circumferential rim and the circular closure plate being located spaced apart relative to the circumferential rim, thereby defining a fluid path between the connecting element and the cylindrical neck part, a collar placeable about the cylindrical neck part, the collar sealing against the connecting element and the beverage container thereby establishing an annular space outside the cylindrical neck part, the collar comprising a gas inlet for injecting gas into the inner space of the beverage container via the annular space, the fluid path and the opening, and a piston for moving the connecting element towards the cylindrical neck part, thereby causing the connecting element to move from the first position to a second position in which the set of inwardly oriented locking parts moves to an arresting position wherein the outer circumferential flange being located between the opening and the set of inwardly oriented locking parts for arresting the connecting element to the cylindrical neck part, and in which the circular closure plate seals against the circumferential rim.

It is understood that the above system according to the second aspect of the invention may be used together with the above methods according to the first aspect.

DETAILED DESCRIPTION OF THE DRAWINGS

Figure 1:
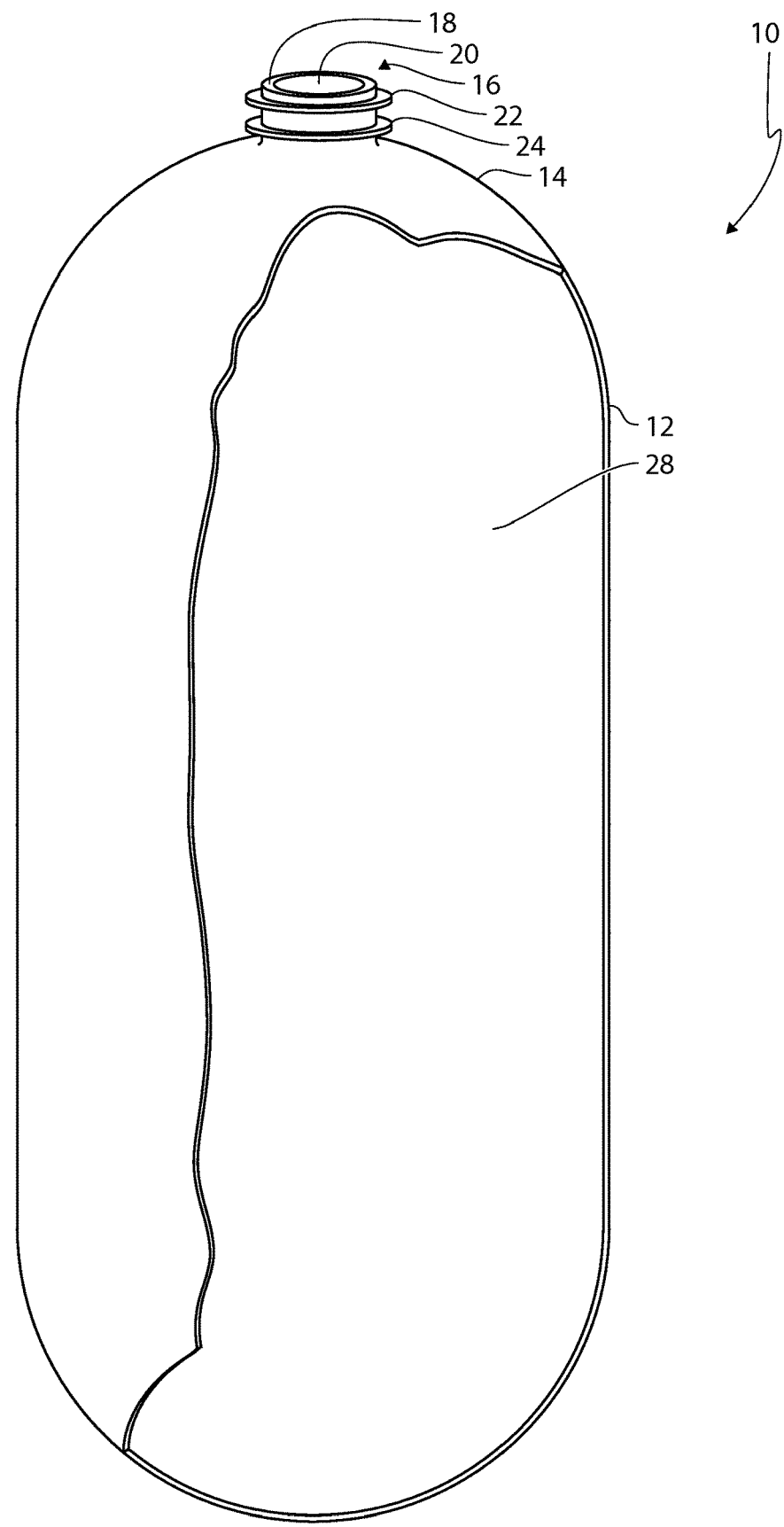
FIG. 1 illustrates a collapsible beverage container before filling.

FIG. 1 shows a perspective view of a collapsible beverage container 10 before filling. The collapsible beverage container 10 comprises a body part 12, a shoulder part 14 and a neck part 16. The neck part 16 comprises a rim 18 defining an opening 20. The neck part 16 further comprises a first circumferential flange 22 and a second circumferential flange 24.

The beverage container 10 is preferably made of blow molded plastic, such as PET. The beverage container defines an inner volume 28. Typical values for the inner volume are between 2 liters and 50 liters.

Figure 2:
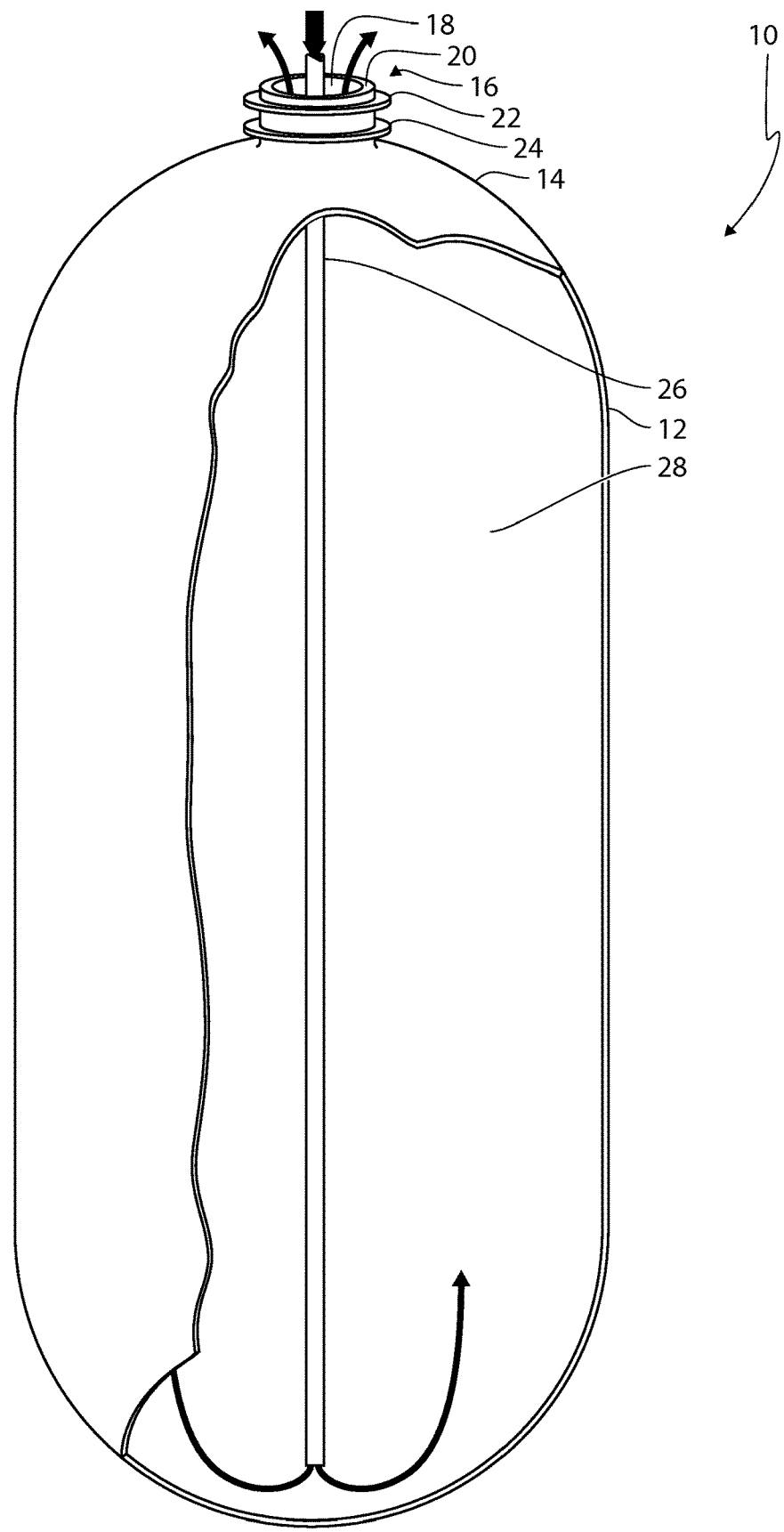
FIG. 2 illustrates the flushing of the inner volume of the beverage container.

FIG. 2 shows a perspective view of the flushing of the inner volume 28 of the beverage container by the use of carbon dioxide. In order to remove all oxygen from the beverage container it is typically flushed by carbon dioxide using a flushing hose 26. All oxygen is thus expelled from the inner volume 28 of the beverage container 10.

Figure 3:
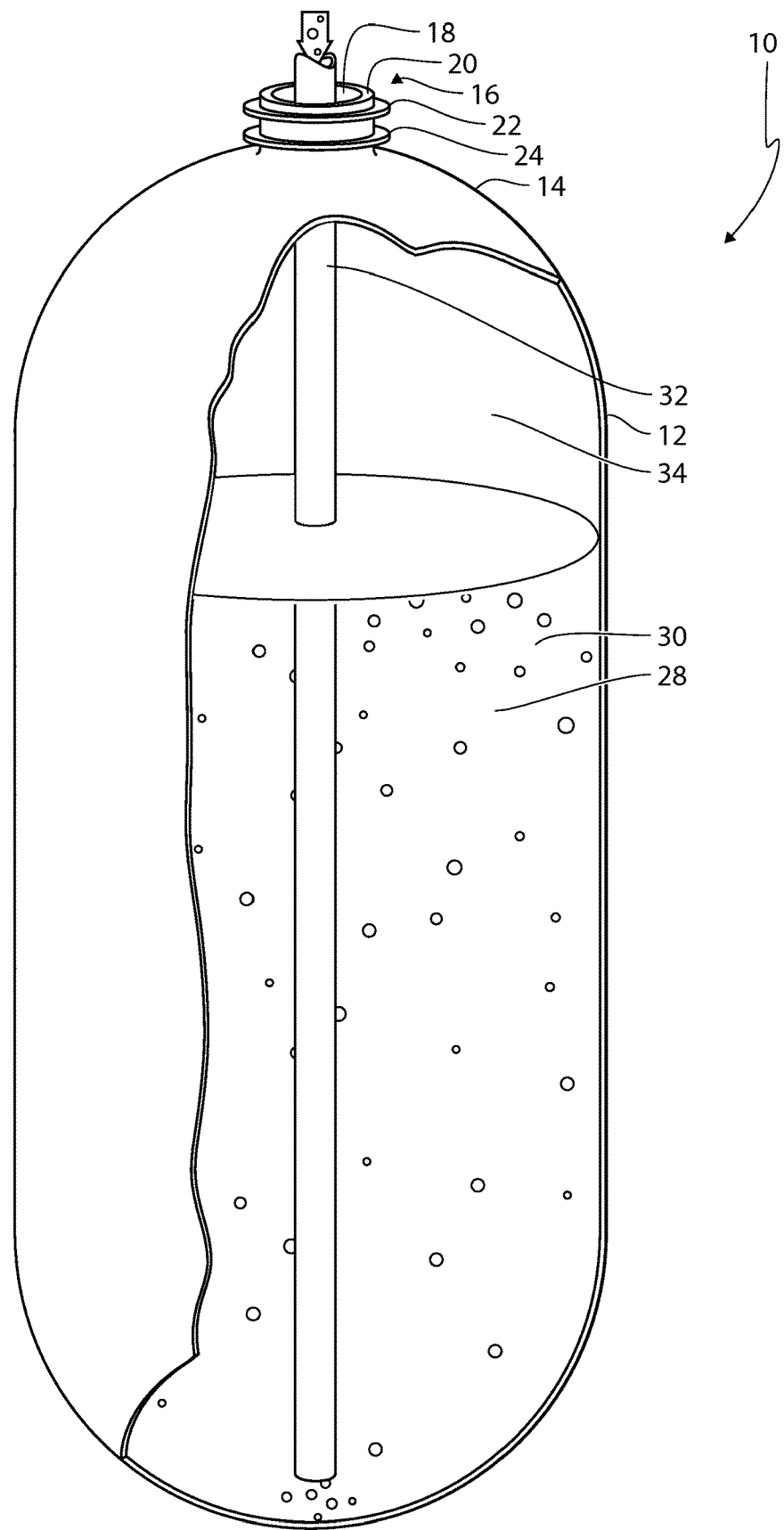
FIG. 3 illustrates the beverage container when it is being filled by beverage.

FIG. 3 shows a perspective view of the beverage container 10 when it is being filled by beverage 30. The inner space 28 of the container is filled by beverage 30 by means of a filling hose 32, thereby establishing a head space 34 of carbon dioxide within the beverage container 10.

Figure 4:
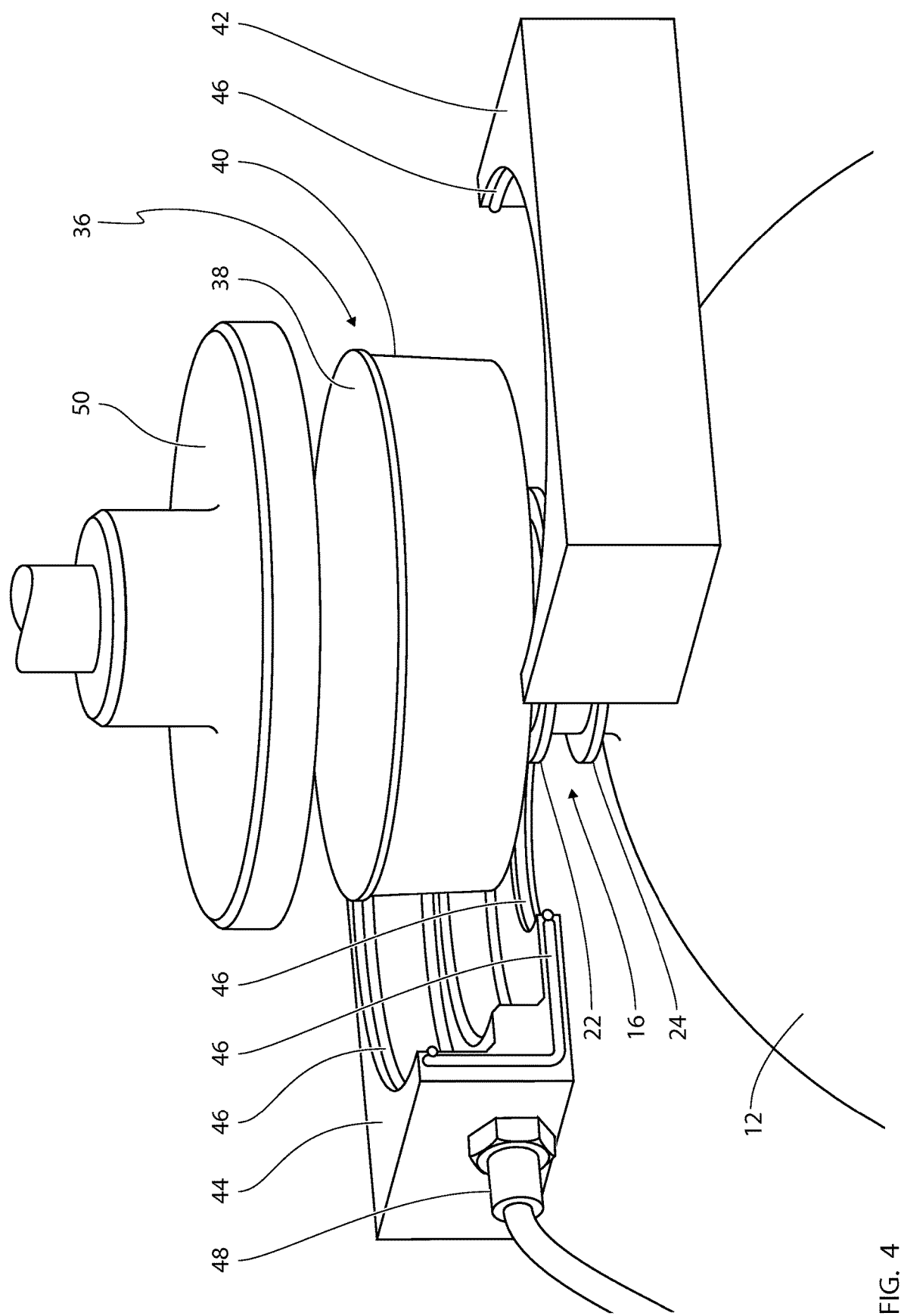
FIG. 4 illustrates the container when being provided with a connecting element.

FIG. 4 shows a perspective view of the beverage container 10 when being provided with a connecting element 36. The connecting element 36 comprises a lid or closure plate 38 and an outer cylindrical wall 40. The lid 38 is protecting the outer cylindrical wall 40 from dust. The outer cylindrical wall 40 is adapted to seal against a collar which is made up of a first collar part 42 and a second collar part 44. The collar parts 42, 44 are provided with sealing 46. The second collar part 44 is provided with a gas inlet 48. Further, a piston 50 is provided.

Figure 5:
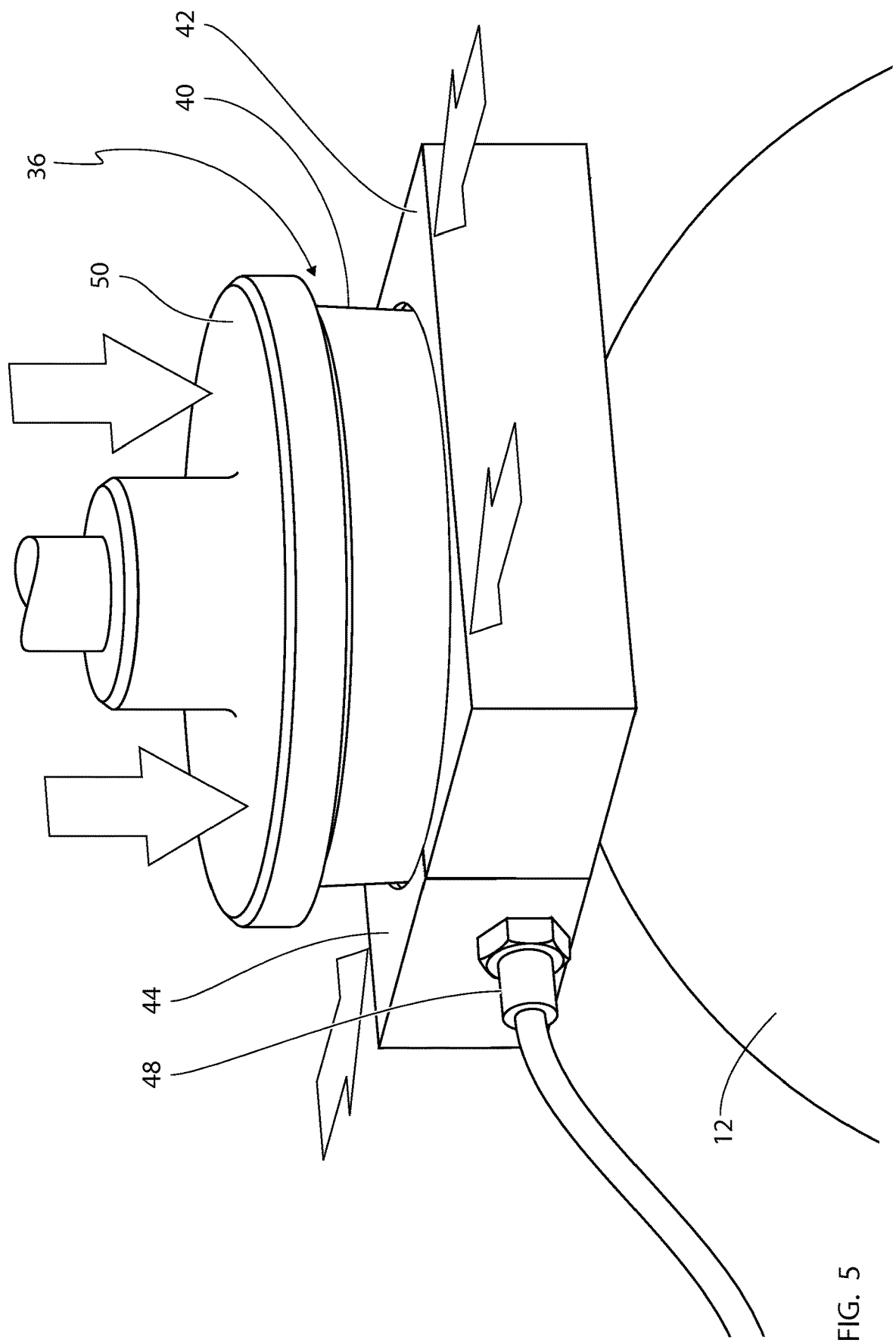
FIG. 5 illustrates the beverage container during the nitrogen injection and capping.

FIG. 5 shows a perspective view of the beverage container 10 during the nitrogen injection and capping. First, the first collar part 42 and a second collar part 44 move towards each other as indicated by the arrows to form the unitary and sealed off collar about the connecting element 36. Then, gas, e.g. nitrogen gas, is injected through the gas inlet 48. Finally, the connecting element 36 is pushed by using a piston 50 towards the beverage container 10 as shown by the arrow in order to arrest the connecting element 36 to the beverage container 10 and to seal the beverage container 10.

Figure 6:
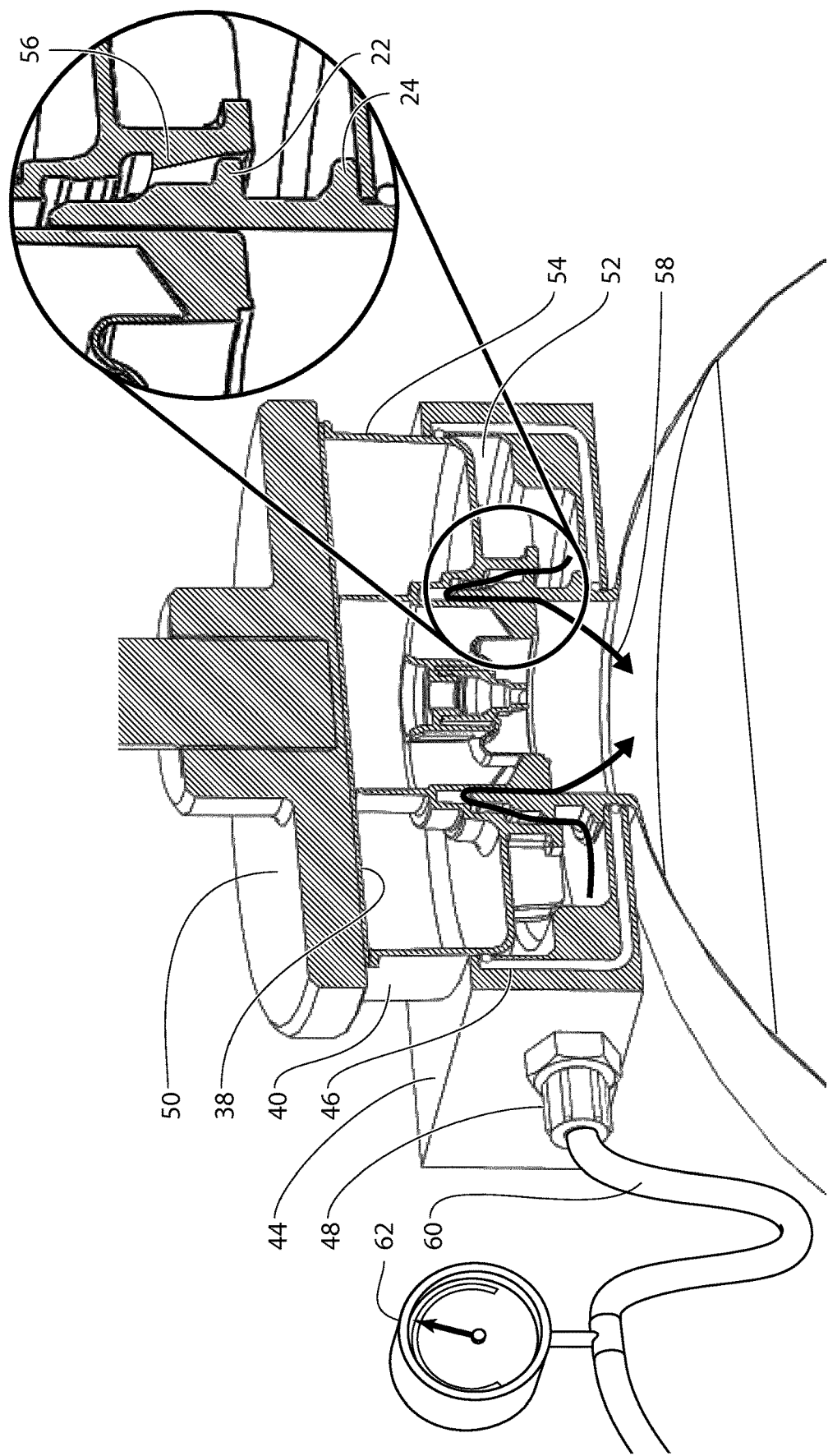
FIG. 6 illustrates the beverage container during the nitrogen injection.

FIG. 6 shows a cut-out perspective view of the beverage container 10 during the nitrogen injection. As can be seen, the collar 42 44 seals between the neck part 16 of the beverage container 10 just below the second flange 24 and the outer cylindrical wall 40 of the connecting element 36, thereby establishing an annular space 52 within the collar 42, 44. The connecting element 36 comprises a cylindrical housing 54 partially covering the neck 16 of the beverage container 10. As can be seen in the close-up view, the housing 54 comprises inwardly oriented locking parts 56 circumferentially distributed on the housing 54. The locking parts 56 may comprise flexible and sloped parts which cooperate with the first flange 22.

In the present first position, which is a loose position, the locking parts 56 are resting on the first flange 22, thereby establishing a fluid path 58 between the annular space 52 and the inner volume 28 of the beverage container 10. A gas hose 60 is connected to the gas inlet 48 for supplying gas, preferably nitrogen gas, to the annular space 52. A pressure gauge 62 is connected to the gas hose 60 for the user to monitor the pressure which is indicative for the amount of gas, e.g. nitrogen, which has been injected into the inner volume 28 of the beverage container 10.

Figure 7:
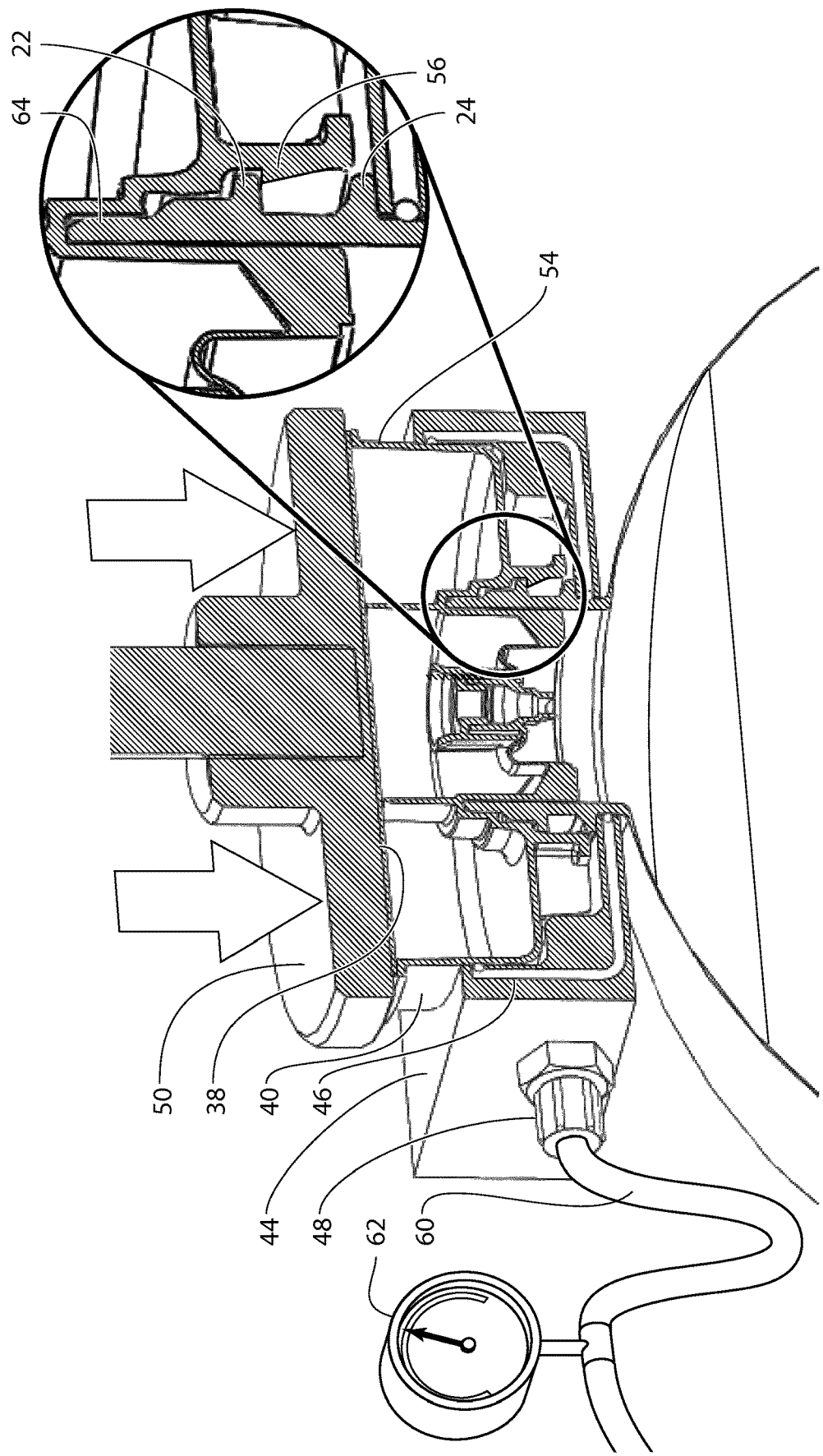
FIG. 7 illustrates the beverage container during the capping of the beverage container.

FIG. 7 shows a cut-out perspective view of the beverage container 10 during the capping of the beverage container 10. By using the piston 50, the connecting element 36 is pushed in the direction of the arrow towards the beverage container 10. As can be seen from the close-up view, the connecting part moves from the previously shown first position into a second position in which the locking parts 56 move past the first flange 22 to an arrested position between the first flange 22 and the second flange 24. At the same time, the housing 54 forming a closure plate 64, seals the opening 20 of the beverage container.

Figure 8:
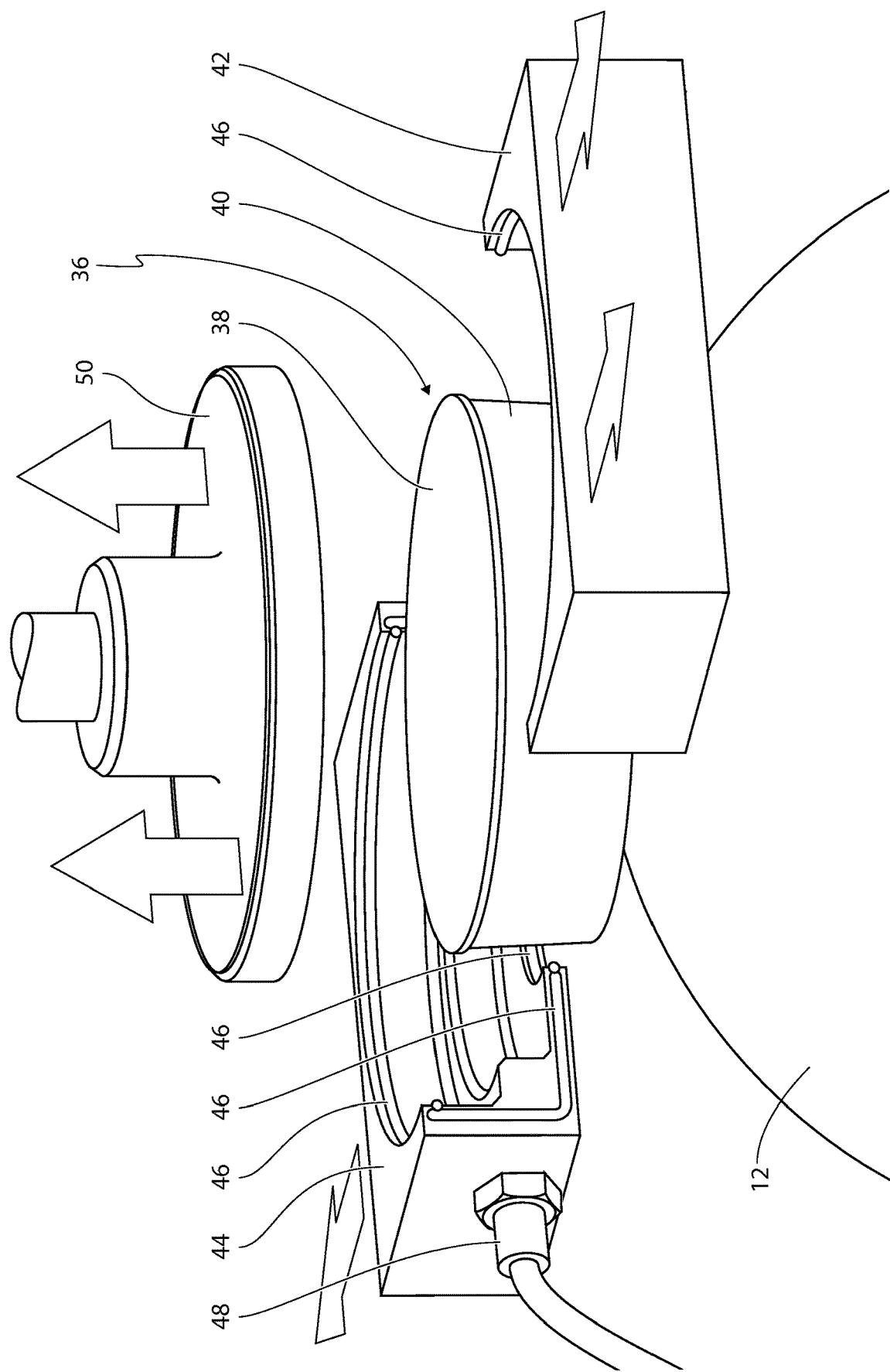
FIG. 8 illustrates the removal of the collar and the piston from the beverage container.

FIG. 8 shows a perspective view of the removal of the collar 42 44 and the piston 50 from the beverage container 10.

Figure 9:
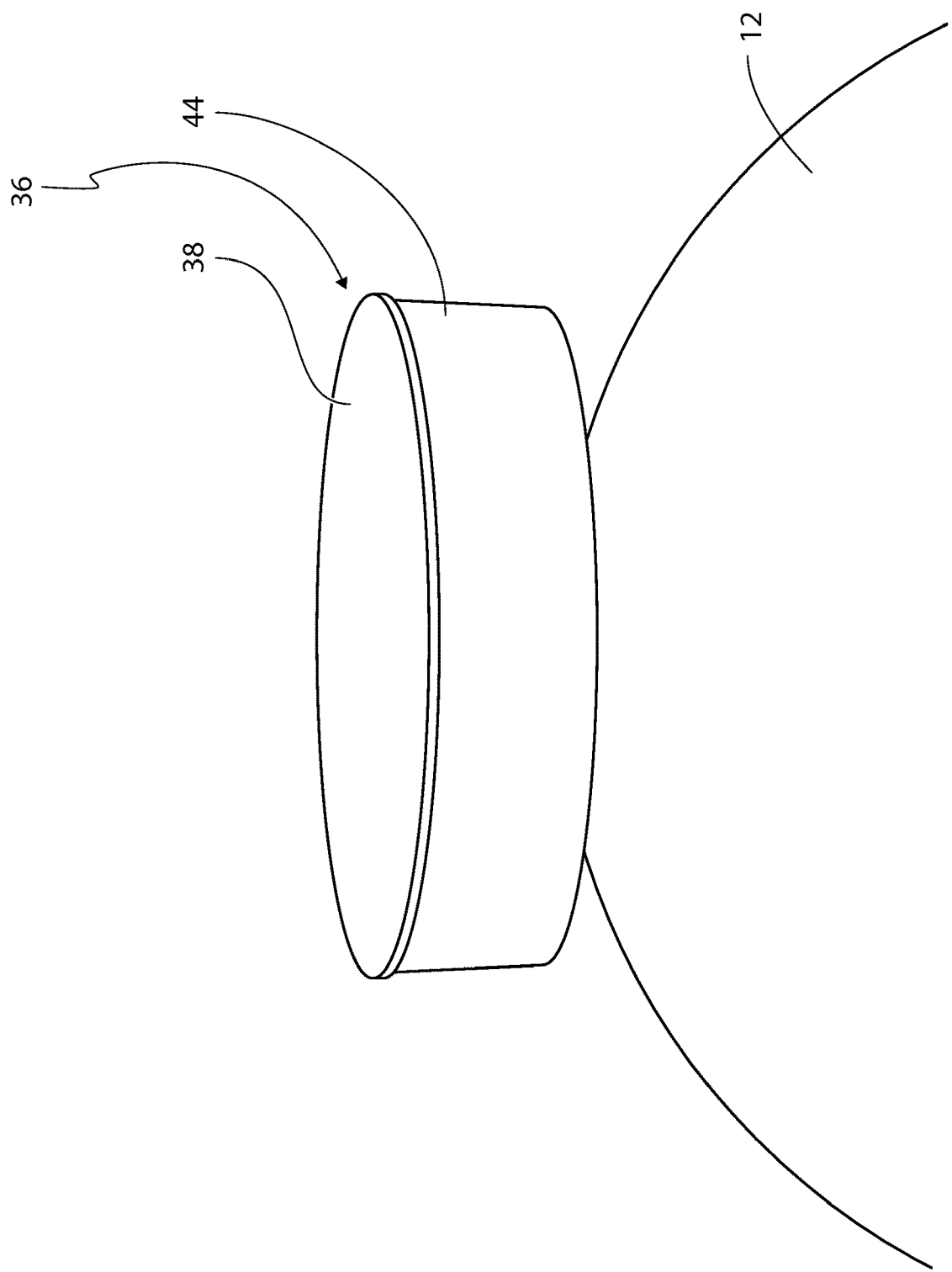
FIG. 9 illustrates the capped beverage container.

FIG. 9 shows a perspective view of the capped beverage container 10.

The invention claimed is:

1. A method of introducing nitrogen into a beverage, said method comprising the steps of:
   providing a collapsible beverage container defining an inner volume, said beverage container comprising a cylindrical neck part, said cylindrical neck part having a circumferential rim defining an opening for allowing access to said inner volume, said cylindrical neck part further comprising an outer circumferential flange encircling said cylindrical neck part;
   filling said beverage into said inner volume via said opening;
   providing a connecting element comprising a cylindrical housing and a circular closure plate, said cylindrical housing comprising a set of inwardly oriented locking parts;
   positioning said connecting element in a first position in which said cylindrical housing is at least partially covering said cylindrical neck part, said set of inwardly oriented locking parts being located adjacent said cylindrical neck part between said outer circumferential flange and said circumferential rim, whereby said circular closure plate is located spaced apart relative to said circumferential rim, thereby defining a fluid path between said connecting element and said cylindrical neck part;
   placing a collar about said cylindrical neck part, said collar sealing against said connecting element and said beverage container, thereby establishing an annular space outside said cylindrical neck part, said collar comprising a gas inlet for allowing access to said annular space;
   injecting gas into said inner space of said beverage container via said gas inlet, said annular space, said fluid path and said opening, wherein said gas is selected from the group consisting of nitrogen (N$_2$), a compound including nitrogen, and a mixture including nitrogen; and moving said connecting element towards said cylindrical neck part, thereby causing said connecting element to move from said first position to a second position in which said set of inwardly oriented locking parts moves to an arresting position wherein said outer circumferential flange is located between said opening and said set of inwardly oriented locking parts for arresting said connecting element to said cylindrical neck part, and in which said circular closure plate seals against said circumferential rim.

2. The method according to claim 1, wherein said beverage is a carbonated beverage.

3. The method according to claim 1, wherein said collar comprises a first collar half part and a second collar half part, such that, when placing said collar about said neck part, said first collar half part and said second collar half part mutually seal against each other, forming said collar.

4. The method according to claim 1, wherein said cylindrical neck part comprises a further outer circumferential flange constituting a delimitation between said cylindrical neck part and a body part of said beverage container, said collar sealing against said body part of said beverage container adjacent said further outer circumferential flange.

5. The method according to claim 1, wherein said connecting element is moved towards said neck part using a piston.

6. The method according to claim 1, wherein said beverage container is a blow molded beverage container.

7. The method according to claim 1, wherein said gas is injected at a pressure of above 2 barg.

8. The method according to claim 1, wherein said circular closure plate comprises a pierceable membrane.

9. The method according to claim 1, wherein said gas inlet comprises at least one of a check valve and a pressure gauge.

10. The method according to claim 1, wherein said connecting element comprises an outer cylindrical wall adapted to slidably seal against said collar.

11. The method according to claim 1, wherein said collar comprises an upper sealing element sealing against said connecting element, and a lower sealing element sealing against said beverage container.

12. The method according to claim 1, wherein said set of inwardly oriented locking parts comprises 2-10 flexible, sloped and spaced apart protrusions.

13. A system for introducing nitrogen into a beverage, said system comprising:

a collapsible beverage container defining an inner volume filled by said beverage, said beverage container comprising a cylindrical neck part, said cylindrical neck part having a circumferential rim defining an opening for allowing access to said inner volume, said cylindrical neck part further comprising an outer circumferential flange encircling said cylindrical neck part;

a connecting element comprising a cylindrical housing and a circular closure plate, said cylindrical housing comprising a set of inwardly oriented locking parts, said connecting element being positionable in a first position in which said cylindrical housing is at least partially covering said cylindrical neck part, said set of inwardly oriented locking parts being located adjacent said cylindrical neck part between said outer circumferential flange and said circumferential rim, wherein said circular closure plate is located spaced apart relative to said circumferential rim, thereby defining a fluid path between said connecting element and said cylindrical neck part;

a collar placeable about said cylindrical neck part, said collar sealing against said connecting element and said beverage container thereby establishing an annular space outside said cylindrical neck part, said collar comprising a gas inlet for injecting a gas into said inner space of said beverage container via said annular space, said fluid path, and said opening, wherein said gas is selected from the group consisting of nitrogen (N$_2$), a compound including nitrogen, and a mixture including nitrogen; and a piston operable for moving said connecting element towards said cylindrical neck part, thereby causing said connecting element to move from said first position to a second position in which said set of inwardly oriented locking parts moves to an arresting position, wherein said outer circumferential flange is located between said opening and said set of inwardly oriented locking parts for arresting said connecting element to said cylindrical neck part, and in which said circular closure plate seals against said circumferential rim.

14. The system according to claim 13, wherein the beverage is a carbonated beverage.

15. The system according to claim 13, wherein the collar comprises a first collar part and a second collar part, each of the first and second collar parts being configured such that, when placing the collar about the neck part, the first collar part and the second collar part mutually seal against each other, thereby forming the collar.

16. The system according to claim 13, wherein the cylindrical neck part comprises a further outer circumferential flange constituting a delimitation between the cylindrical neck part and a body part of the beverage container, and wherein the collar seals against the body part of the beverage container adjacent the further outer circumferential flange.

17. The system according to claim 13, wherein the beverage container is a blow molded beverage container.

18. The system according to claim 13, wherein the circular closure plate comprises a pierceable membrane.

19. The system according to claim 13, wherein the gas inlet comprises at least one of a check valve and a pressure gauge.

20. The system according to claim 13, wherein the connecting element comprises an outer cylindrical wall configured to slidably seal against the collar.

21. The system according to claim 13, wherein the collar comprises an upper sealing element sealing against the connecting element, and a lower sealing element sealing against the beverage container.

22. The system according to claim 13, wherein the set of inwardly oriented locking parts comprises between 2 and 10 flexible, sloped and spaced apart protrusions.

* * * * *